(12) United States Patent
Tabata et al.

(10) Patent No.: US 12,466,260 B2
(45) Date of Patent: Nov. 11, 2025

(54) INFORMATION PROCESSING DEVICE, VEHICLE, AND STORAGE MEDIUM

(71) Applicant: TOYOTA JIDOSHA KABUSHIKI KAISHA, Toyota (JP)

(72) Inventors: Mitsuhiro Tabata, Sunto-gun (JP); Motoki Takahashi, Susono (JP); Naofumi Magarida, Sunto-gun (JP); Yuko Azuma, Numazu (JP); Takaharu Tateishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 363 days.

(21) Appl. No.: 17/808,660

(22) Filed: Jun. 24, 2022

(65) Prior Publication Data
US 2023/0066439 A1 Mar. 2, 2023

(30) Foreign Application Priority Data
Aug. 26, 2021 (JP) .................... 2021-138326

(51) Int. Cl.
| | |
|---|---|
| *B60L 1/00* | (2006.01) |
| *B60W 10/26* | (2006.01) |
| *B60W 60/00* | (2020.01) |
| *G07C 9/00* | (2020.01) |
| *G07C 9/25* | (2020.01) |

(52) U.S. Cl.
CPC .............. *B60L 1/00* (2013.01); *B60W 10/26* (2013.01); *B60W 60/00* (2020.02); *G07C 9/00309* (2013.01); *G07C 9/25* (2020.01); *G07C 2009/00507* (2013.01)

(58) Field of Classification Search
CPC ........ B60L 1/00; B60L 2250/16; B60L 1/006; B60W 10/26; B60W 60/00; G07C 9/00309; G07C 9/25; G07C 2009/00507; G07C 9/23; G07C 9/22; Y02T 10/70
See application file for complete search history.

(56) References Cited

U.S. PATENT DOCUMENTS

| | | | | |
|---|---|---|---|---|
| 2002/0108411 A1* | 8/2002 | Cardwell | ............. | B60R 25/005 70/226 |
| 2005/0134115 A1* | 6/2005 | Betts, Jr. | ................ | B60R 25/00 307/10.1 |
| 2006/0202797 A1* | 9/2006 | Theis | .................... | B60R 25/252 340/5.72 |
| 2009/0313103 A1* | 12/2009 | Ambrosio | ............... | B60L 53/64 705/14.34 |
| 2013/0026973 A1* | 1/2013 | Luke | ....................... | G07F 11/62 320/106 |

(Continued)

FOREIGN PATENT DOCUMENTS

JP 2015-122892 A 7/2015

*Primary Examiner* — Kamini S Shah
*Assistant Examiner* — Mohammed Shafayet
(74) *Attorney, Agent, or Firm* — Oblon, McClelland, Maier & Neustadt, L.L.P.

(57) ABSTRACT

The information processing device includes a processor configured to control setting and cancellation of a power supply mode in which the power supply device operates, for a vehicle including the power supply device that supplies electric power to the outside. The processor outputs information requesting an input of authentication information when a canceling request of the power supply mode that is set is acquired.

14 Claims, 7 Drawing Sheets

(56) References Cited

U.S. PATENT DOCUMENTS

| | | | |
|---|---|---|---|
| 2014/0232180 A1* | 8/2014 | Kinomura | H02J 3/322 |
| | | | 307/9.1 |
| 2014/0247017 A1* | 9/2014 | Weigmann | B60L 58/10 |
| | | | 320/136 |
| 2015/0217656 A1* | 8/2015 | Loftus | B60L 1/006 |
| | | | 320/136 |
| 2019/0299803 A1* | 10/2019 | Cheng | B60L 53/16 |
| 2022/0203861 A1* | 6/2022 | Dow | B60L 55/00 |

* cited by examiner

INFORMATION PROCESSING DEVICE, VEHICLE, AND STORAGE MEDIUM

CROSS-REFERENCE TO RELATED APPLICATION

This application claims priority to Japanese Patent Application No. 2021-138326 filed on Aug. 26, 2021, incorporated herein by reference in its entirety.

BACKGROUND

1. Technical Field

The present disclosure relates to an information processing device, a vehicle, and a storage medium.

2. Description of Related Art

Japanese Unexamined Patent Application Publication No. 2015-122892 (JP 2015-122892 A) discloses a vehicle capable of supplying power to a facility such as a house outside the vehicle.

SUMMARY

When the vehicle disclosed in JP 2015-122892 A supplies power to the facility, there is a case in which the passenger of the vehicle leaves the vehicle. Assuming such a situation, it was required to ensure security during power supply in the vehicle that can supply power to the facility.

The present disclosure has been made in view of the above, and an object of the present disclosure is to provide an information processing device, a vehicle, and a storage medium capable of ensuring security during power supply in a vehicle capable of supplying power to a facility.

An information processing device according to the present disclosure includes a processor configured to control setting and cancellation of a power supply mode in which a power supply device operates, for a vehicle including the power supply device that supplies electric power to the outside. The processor outputs information requesting an input of authentication information when a canceling request of the power supply mode that is set is acquired.

A vehicle according to the present disclosure includes: a power supply device that supplies electric power to the outside; and a processor configured to control setting and cancellation of the power supply mode in which a power supply device operates. The processor outputs information requesting an input of authentication information when a canceling request of the power supply mode that is set is acquired.

A storage medium according to the present disclosure stores a program that causes a processor to execute: controlling setting and cancellation of a power supply mode in which a power supply device operates, for a vehicle including a power supply device that supplies electric power to the outside; and outputting information requesting an input of authentication information when a canceling request of the power supply mode that is set is acquired.

According to the present disclosure, it is possible to ensure security during power supply in a vehicle capable of supplying power to a facility.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An information processing device, a vehicle, and a program according to the embodiment of the present disclosure will be described with reference to the drawings. Note that, constituent components in the following embodiment also include those that can be easily replaced by those skilled in the art, or those that are substantially identical.

First Embodiment

Figure 1:
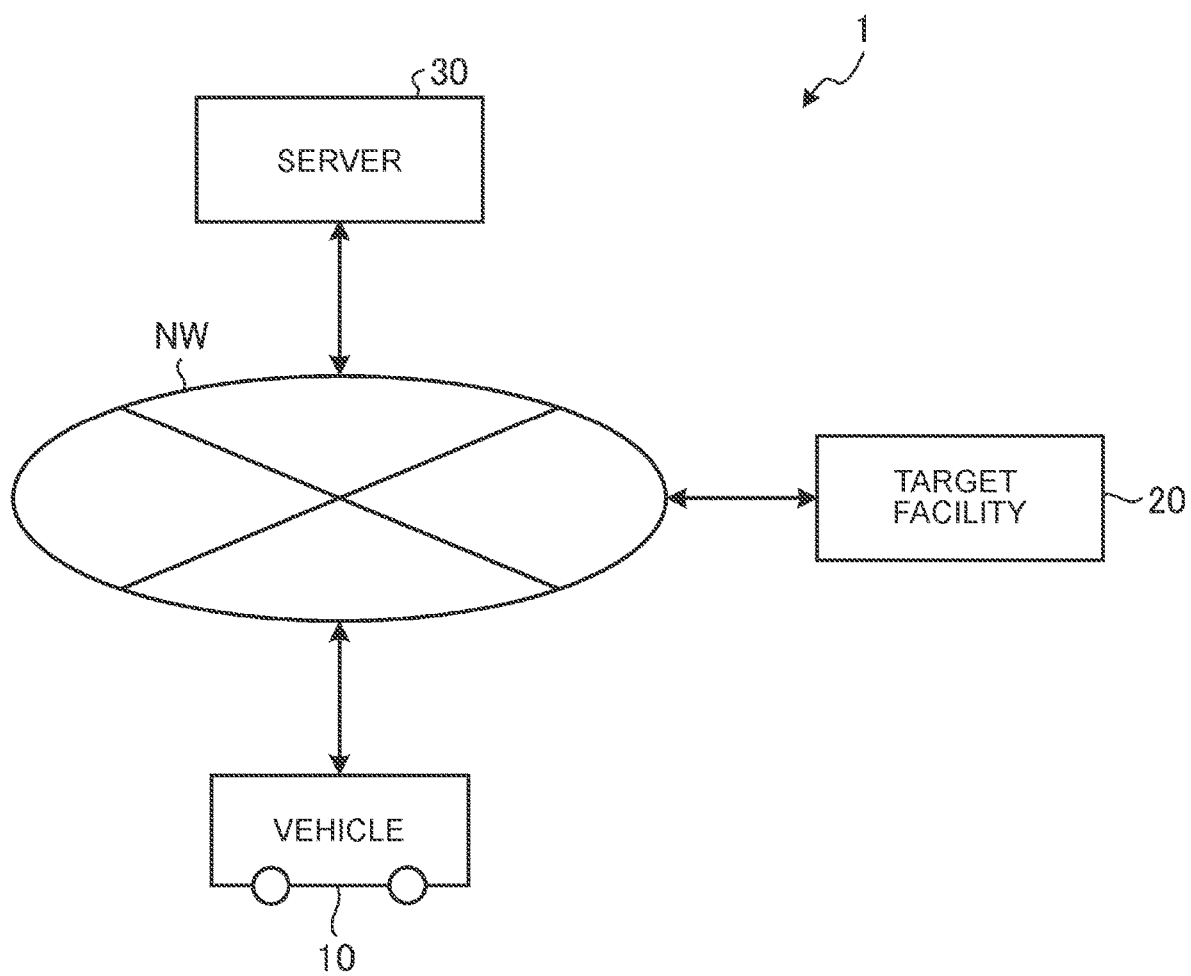
FIG. 1 is a diagram schematically showing a configuration of a power supply system including an information processing device according to a first embodiment.

A power supply system including the information processing device according to the first embodiment will be described with reference to FIGS. 1 to 3. FIG. 1 is a diagram schematically showing a configuration of a power supply system including the information processing device according to the first embodiment. As shown in FIG. 1, a power supply system 1 includes a vehicle 10, a target facility 20, and a server 30. In the power supply system 1, for example, the server 30 assists the power supply from the vehicle 10 to the target facility 20.

The vehicle 10, the target facility 20, and the server 30 are configured to be able to communicate with each other through a network NW. The network NW is, for example, a public communication network such as the Internet, and may include a wide area network (WAN), a telephone communication network, and other communication networks such as a wireless communication network including Wi-Fi (registered trademark).

Further, for example, communication between the vehicle 10 and the target facility 20 is not limited to being performed via the network NW, and the vehicle 10 and the target facility 20 may be able to communicate directly with each other without the network NW. As a result, even if the network NW cannot be used in the event of a disaster, power can be supplied from the vehicle 10 to the target facility 20.

The vehicle 10 is an autonomous traveling vehicle configured to be able to travel autonomously in accordance with at least a given traveling command. The vehicle 10 can supply a part of the electric power generated by driving an engine with fuel such as gasoline or hydrogen, or a part of the power stored in a power supply device to the outside.

The target facility 20 is a facility to be supplied with power such as a house to which the vehicle 10 is to be supplied with power.

Figure 2:
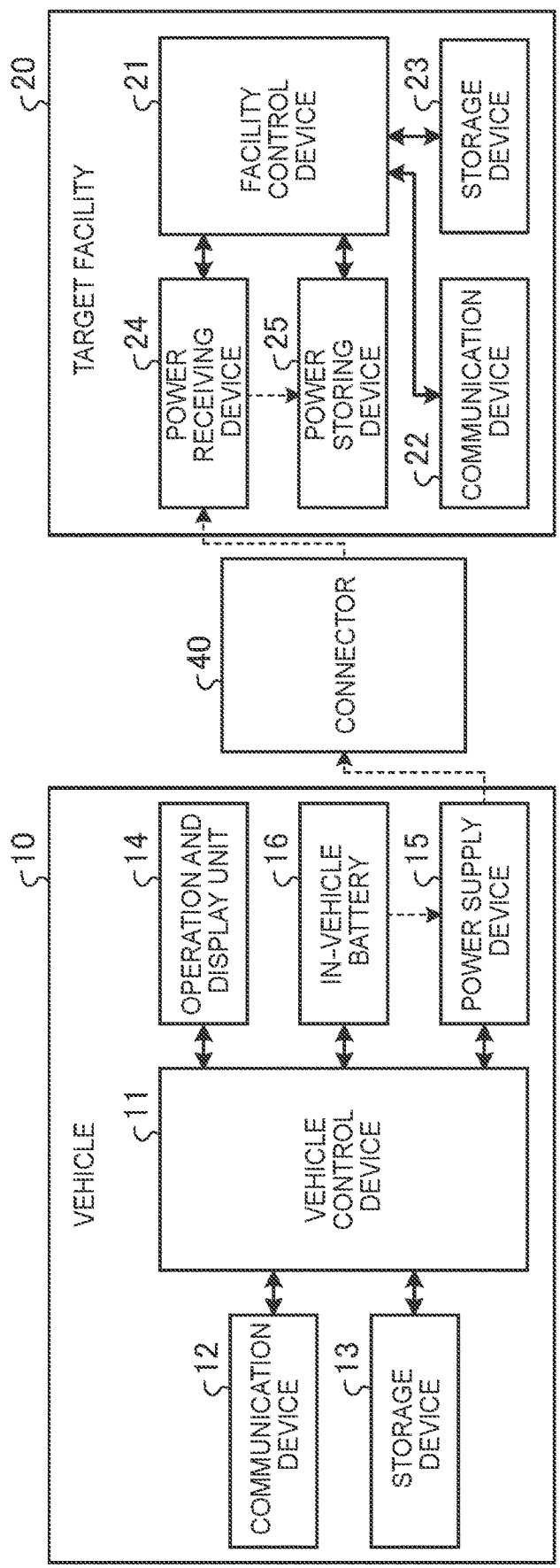
FIG. 2 is a diagram schematically showing a state in which the vehicle and a target facility are connected by a connector.

FIG. 2 is a diagram schematically showing a state in which the vehicle and a target facility are connected by a connector. The vehicle 10 includes a vehicle control device 11, a communication device 12, a storage device 13, an operation and display unit 14, a power supply device 15, and an in-vehicle battery 16.

The vehicle control device 11 is provided with a processor including a central processing unit (CPU), a digital signal processor (DSP), a field-programmable gate array (FPGA), etc., and a memory including a random access memory (RAM), a read-only memory (ROM), etc. The vehicle control device 11 loads a program stored in the storage device 13 into the work area of the memory and executes the program, and controls each component, etc. through the execution of the program such that the function that satisfies a predetermined purpose can be realized.

The vehicle control device 11 controls the setting and cancellation of a power supply mode in which the power supply device 15 operates. The vehicle control device 11 outputs information requesting input of authentication information when a canceling request of the power supply mode that is set is acquired. The authentication information is, for example, an authentication password.

The communication device 12 is composed of, for example, a local area network (LAN) interface board, a wireless communication circuit for wireless communication, and the like. The communication device 12 is connected to the network NW such as the Internet that is a public communication network. The communication device 12 communicates with the target facility 20 and the server 30 by connecting to the network NW.

The storage device 13 is configured of a recording medium (storage medium) such as an erasable programmable ROM (EPROM), a hard disk drive (HDD), and a removable medium. Examples of the removable medium include recording media such as an optical disc (e.g. compact disc (CD)-R or CD-ROM, digital versatile disc (DVD)-R or DVD-ROM, Blu-ray (registered trademark) disc) and a flash memory (e.g. a universal serial bus (USB) memory, a memory card). The storage device 13 can store an operating system (OS), various programs, various tables, various databases, and the like.

The operation and display unit 14 is composed of, for example, a touch panel display, and has an input function for receiving an operation of the user with a finger, etc. and a display function for displaying various types of information based on the control of the vehicle control device 11. The operation and display unit 14 is, for example, a touch panel display of a car navigation system.

The power supply device 15 supplies electric power to the outside of the vehicle 10. Specifically, the power supply device 15 is an inlet to which the connection portion of a connector 40 is connected, and power is supplied to the power receiving device 24 via the connector 40 in a contact manner. Further, the power supply device 15 may bring the power transmission coil and the power receiving coil close to each other and supply power to the power receiving device 24 in a non-contact manner via the power transmitting coil and the power receiving coil.

The in-vehicle battery 16 is composed of, for example, a secondary battery such as a nickel-metal hydride battery or a lithium-ion battery, and supplies electric power to a drive device including a motor or an inverter of the vehicle 10. Further, the in-vehicle battery 16 may be configured to be rechargeable with power of the driven engine. When the vehicle 10 is a gasoline-powered vehicle, it may be configured not to have the in-vehicle battery 16.

The target facility 20 includes a facility control device 21, a communication device 22, a storage device 23, the power receiving device 24, and a power storage device 25. The physical configurations of the facility control device 21, the communication device 22, and the storage device 23 are the same as, for example, the configurations of the vehicle control device 11, the communication device 12, and the storage device 13 included in the vehicle 10, respectively.

The power receiving device 24 receives the electric power from the power supply device 15 via the connector 40. The power receiving device 24 has a connection portion such as an outlet connected to the connector 40.

The power storage device 25 is composed of, for example, a secondary battery such as a nickel hydrogen battery or a lithium ion battery, and stores electric power that is used in the target facility 20.

The connector 40 connects the power supply device 15 of the vehicle 10 and the power receiving device 24 of the target facility 20. The connector 40 has a connection portion connected to the inlet of the power supply device 15 and an outlet insertion slot to which an outlet of the power receiving device 24 is connected.

Figure 3:
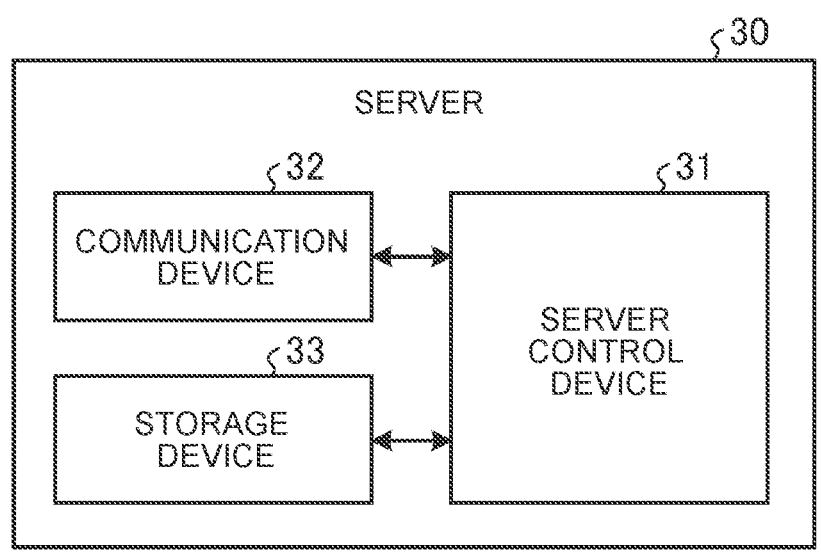
FIG. 3 is a diagram showing a schematic configuration of a server.

FIG. 3 is a diagram showing a schematic configuration of the server. The server 30 includes a server control device 31, a communication device 32, and a storage device 33. The physical configurations of the server control device 31, the communication device 32, and the storage device 33 are the same as, for example, the configurations of the vehicle control device 11, the communication device 12, and the storage device 13 included in the vehicle 10, respectively.

Figure 4:
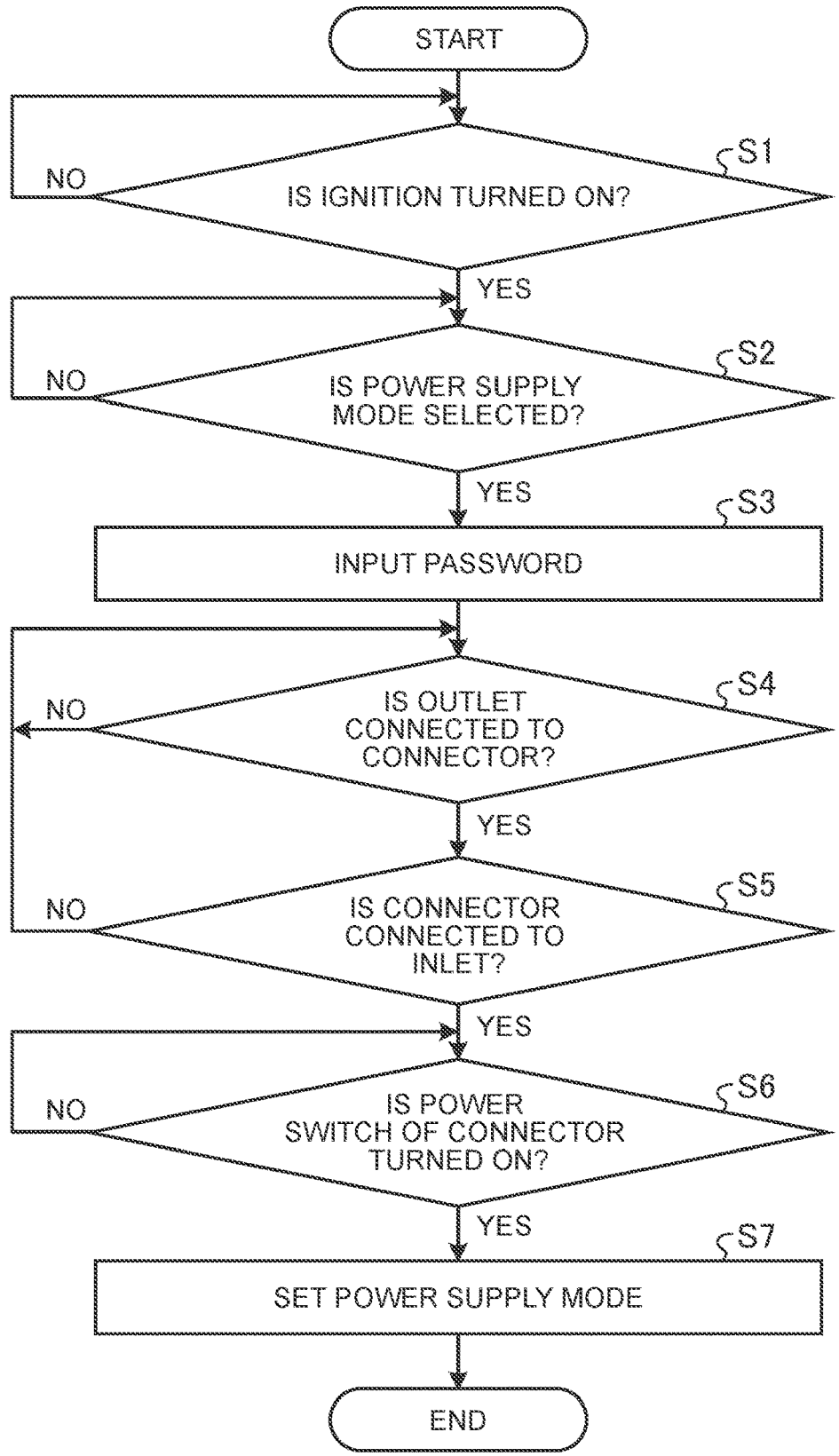
FIG. 4 is a diagram showing a flowchart of a process in which a vehicle control device sets a power supply mode.

Next, the process executed by the vehicle control device 11 will be described with reference to FIGS. 4 and 5. FIG. 4 is a diagram showing a flowchart of a process in which the vehicle control device sets the power supply mode. First, the vehicle control device 11 determines whether the ignition switch provided inside the vehicle 10 is turned on (step S1). The ignition switch is a switch that starts driving of the engine when pressed. The vehicle control device 11 may determine whether the engine key inserted into the keyhole of the vehicle 10 is turned and the engine is driven. When the vehicle control device 11 determines that the ignition switch is not turned on (step S1: No), the vehicle control device 11 repeats the process of step S1.

When the vehicle control device 11 determines that the ignition switch has been turned on (step S1: Yes), the vehicle control device 11 determines whether the power supply mode is selected (step S2). Specifically, the vehicle control device 11 determines whether the operation and display unit 14 has received an input for selecting a power supply mode. When the vehicle control device 11 determines that the power supply mode is not selected (step S2: No), the vehicle control device 11 repeats the process of step S2.

When the vehicle control device 11 determines that the power supply mode is selected (step S2: Yes), the vehicle control device 11 accepts the input of the password to the operation and display unit 14 (step S3). Then, the vehicle control device 11 stores the input password in the storage device 13 as an authentication password when canceling the power supply mode.

Subsequently, the vehicle control device 11 determines whether the outlet insertion slot of the power receiving device 24 is connected to the outlet insertion slot of the connector 40 (step S4). Further, the vehicle control device 11 determines whether the connection portion of the connector 40 is connected to the inlet of the power supply device 15 (step S5). When the vehicle control device 11 determines that the outlet of the power receiving device 24 is not connected to the outlet insertion slot of the connector 40, or the connection portion of the connector 40 is not connected to the inlet of the power supply device 15 (steps S4, S5: No), the vehicle control device 11 repeats the processes of steps S4, S5.

When the vehicle control device 11 determines that the outlet of the power receiving device 24 is connected to the outlet insertion slot of the connector 40 and the connection portion of the connector 40 is connected to the inlet of the power supply device 15 (step S4, S5: Yes), the vehicle control device 11 determines whether the power switch provided on the connector 40 is turned on (step S6). When the vehicle control device 11 determines that the power switch is not turned on (step S6: No), the vehicle control device 11 repeats the process of step S6.

When the vehicle control device 11 determines that the power switch is turned on (step S6: Yes), the vehicle control device 11 sets the vehicle 10 to the power supply mode (step S7), and the vehicle 10 starts supplying power to the target facility 20. Then, the vehicle control device 11 ends the process of setting the power supply mode.

Figure 5:
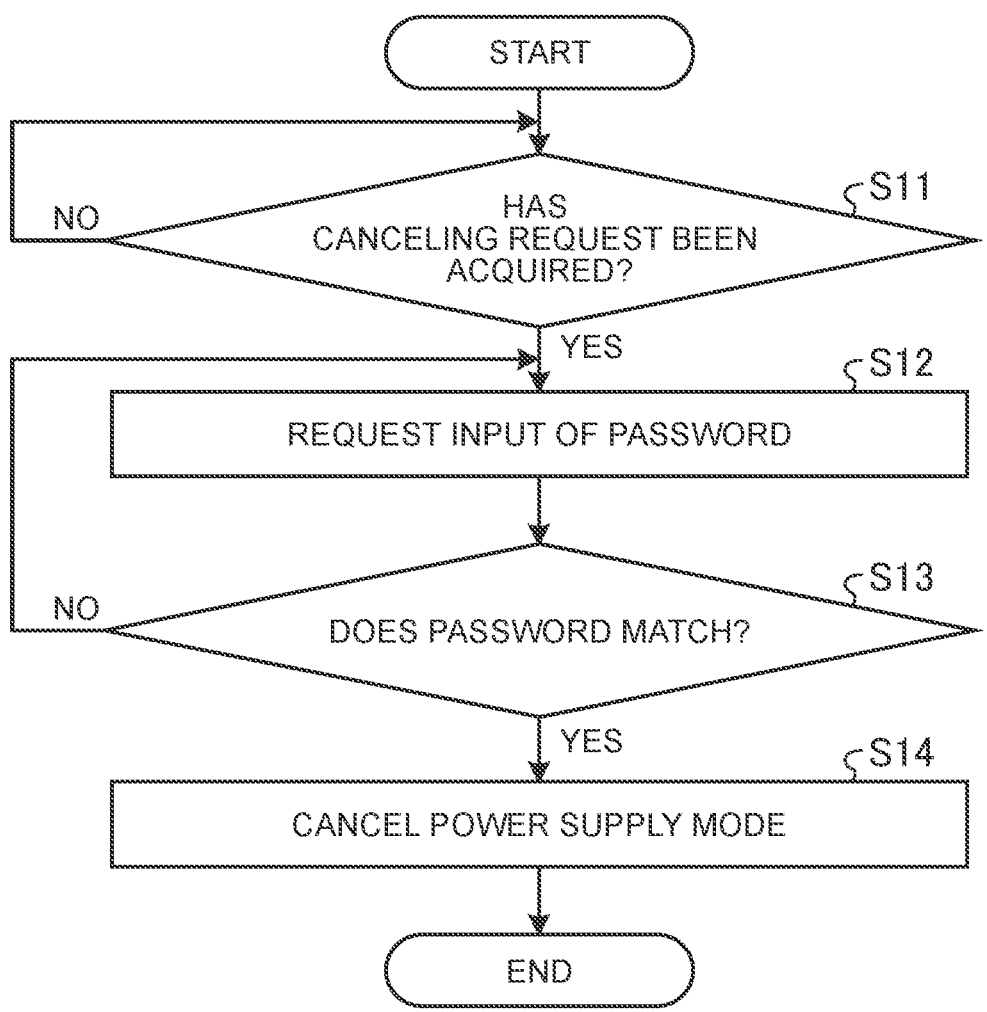
FIG. 5 is a diagram showing a flowchart of a process in which a vehicle control device cancels the power supply mode.

FIG. 5 is a diagram showing a flowchart of a process in which a vehicle control device cancels the power supply mode. First, the vehicle control device 11 determines whether the canceling request of the power supply mode that is set has been acquired (step S11). Specifically, the vehicle control device 11 determines whether an operation instruction requesting the power supply mode to be canceled has been given to the operation and display unit 14. When it is determined that the vehicle control device 11 has not acquired the canceling request of the power supply mode that is set (step S11: No), the vehicle control device 11 repeats the process of step S11. In the vehicle control device 11, when the operation and display unit 14 of the vehicle 10 acquires an operation instruction other than a canceling request of the power supply mode, or various operation instructions for a switch of an air conditioner or an audio equipment, and the like, instead of performing control in accordance with those operation instructions, information for requesting input of canceling request of the power supply mode that is set may be output and displayed on the operation and display unit 14. As a result, it is possible to suppress the power supply from being hindered by using various functions other than the canceling request while the power supply mode is set.

When the vehicle control device 11 determines that the canceling request of the power supply mode that is set is acquired (step S11: Yes), the vehicle control device 11 outputs, for example, information requesting the input of the authentication password as the authentication information. (step S12), and the information is displayed on the operation and display unit 14.

Subsequently, the vehicle control device 11 determines whether the input password matches the authentication password stored in the storage device 13 in step S3 (step S13). When the vehicle control device 11 determines that the passwords do not match (step S13: No), the vehicle control device 11 repeats the process of step S12. The vehicle control device 11 may not be able to cancel the power supply mode when the password mismatch continues for a predetermined number of times.

When the vehicle control device 11 determines that the passwords match (step S13: Yes), the vehicle control device 11 cancels the power supply mode of the vehicle 10 (step S14). Then, the vehicle control device 11 ends the process of canceling the power supply mode.

With the vehicle control device 11 according to the embodiment described above, since the input of the authentication information is required when the power supply mode is canceled, it is possible to ensure the security during power supply in the vehicle 10 capable of supplying power to the target facility 20.

Further, the vehicle control device 11 does not require another device or the like by requesting authentication using the authentication password, and can easily secure the security of the vehicle 10 during power supply.

Further, the vehicle control device 11 may stop the traveling function of the vehicle 10 in the power supply mode. This makes it possible to suppress the vehicle 10 being supplied with power from being stolen even when a person leaves the vehicle 10 in the event of a disaster or at night.

Further, the vehicle control device 11 may lock the steering wheel of the vehicle 10 in the power supply mode. Thereby, the security of the vehicle 10 during power supply can be further enhanced.

Further, the vehicle control device 11 may be configured to interlock with a tire lock device that regulates a rotation of a tire by being attached to the tire. Specifically, the vehicle control device 11 locks the tire lock device in the power supply mode. Thereby, the security of the vehicle 10 during power supply can be further enhanced.

Further, the authentication information may be biometric information for authentication. Information on fingerprints, veins, faces, voices, etc. can be used as biological information. As a result, the user does not need to memorize the password, and more reliable security can be ensured.

Further, the authentication information may be information regarding the position of the key of the vehicle 10. The information regarding the position of the key of the vehicle 10 is information such as the key of the vehicle 10 is placed in a predetermined position, the key of the vehicle 10 is located inside the vehicle 10, or the key of the vehicle 10 is inserted into a predetermined keyhole, and the information regarding the position of the key of the vehicle 10 can be acquired by detecting electromagnetic waves output by the key of the vehicle 10 by various sensors. As a result, the security of the vehicle 10 during power supply can be easily ensured without the need for any device other than the key of the vehicle 10.

Second Embodiment

Figure 6:
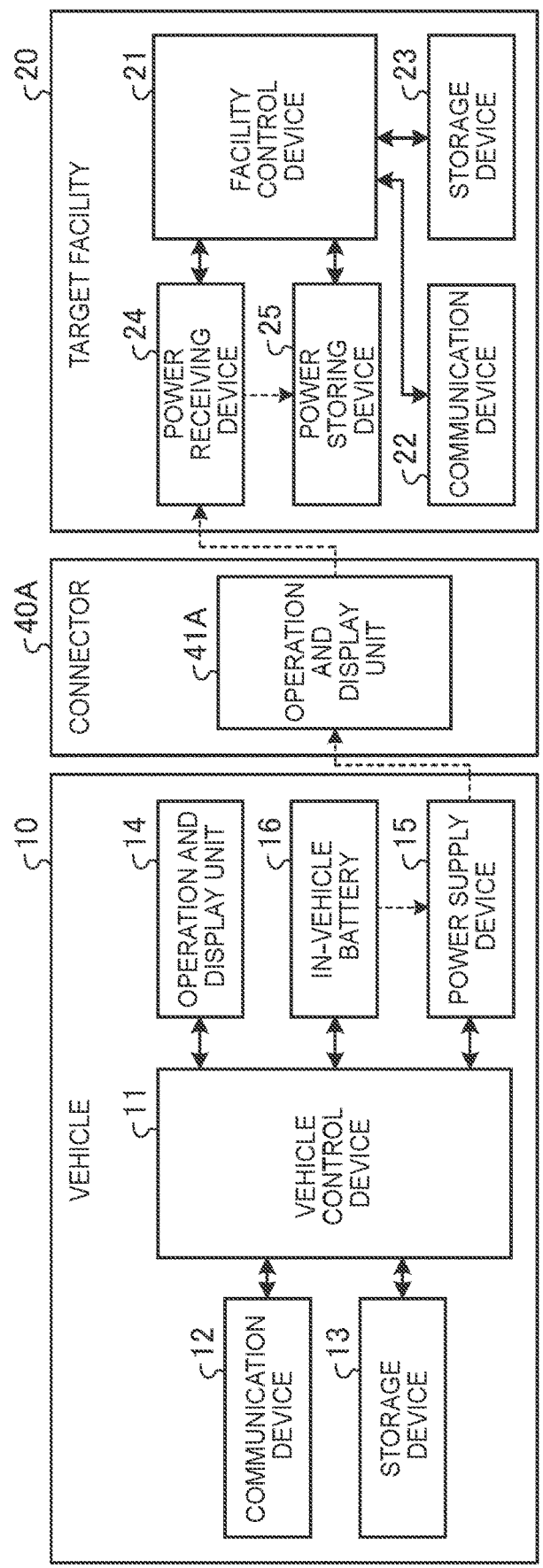
FIG. 6 is a diagram schematically showing a configuration of the power supply system including the information processing device according to a second embodiment.

FIG. 6 is a diagram schematically showing a configuration of the power supply system including the information processing device according to a second embodiment. As shown in FIG. 6, a connector 40A has an operation and display unit 41A.

Figure 7:
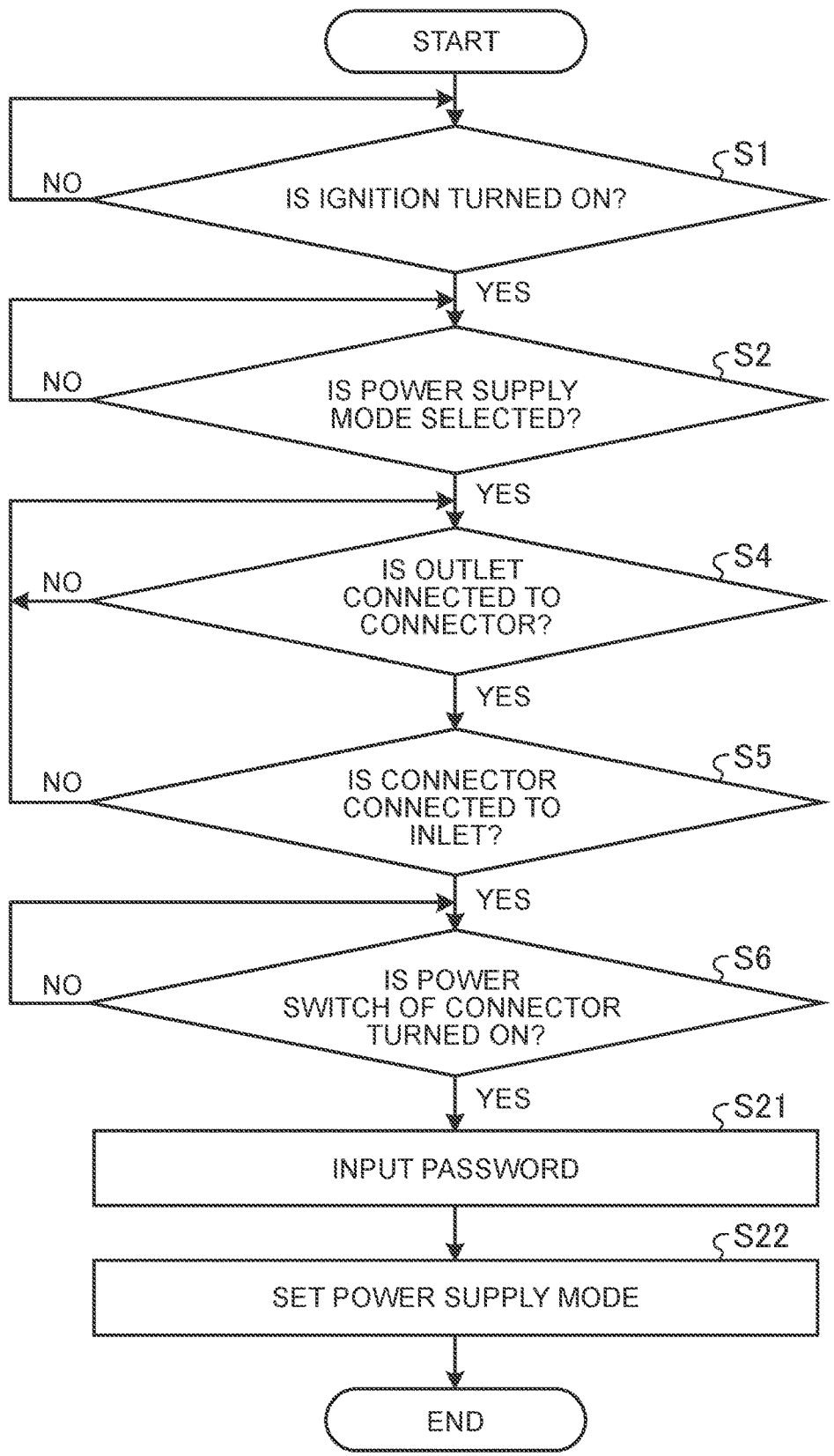
FIG. 7 is a diagram showing a flowchart of a process in which the vehicle control device sets the power supply mode.

FIG. 7 is a diagram showing a flowchart of a process in which the vehicle control device sets the power supply mode. As shown in FIG. 7, the vehicle control device 11 executes the processes of steps S1, S2, S4, S5, and S6 as in the first embodiment.

Subsequently, the vehicle control device 11 accepts the input of the password to the operation and display unit 41A (step S21). The vehicle control device 11 stores the input password in the storage device 13 as an authentication password when canceling the power supply mode.

After that, the vehicle control device 11 sets the vehicle 10 to the power supply mode (step S22), and starts supplying power from the vehicle 10 to the target facility 20. Then, the vehicle control device 11 ends the process of setting the power supply mode.

As described above, when the connector 40A has the operation and display unit 41A, the vehicle control device 11 may accept input of a password or the like from the operation and display unit 41A.

Further, the vehicle control device 11 may lock the door of the vehicle 10 in the power supply mode. This makes it possible to further enhance the security of the power supply mode. Further, it is possible to suppress a luggage placed in the vehicle 10 during power supply from being stolen.

Further, when the connector 40A includes a processor including a CPU and the like and a memory including a RAM and a ROM and the like, when the connector 40A inputs the authentication information when the canceling request of the power supply mode that is set is acquired, information requesting the input of the authentication information may be output.

Further effects and modifications can be easily derived by those skilled in the art. The broader aspects of the present disclosure are not limited to the particular details and representative embodiments shown and described above. Accordingly, various modifications may be made without departing from the spirit or scope of the general concept of the disclosure defined by the appended claims and their equivalents. For example, the target facility 20 or the server 30 may output information requesting input of authentication information when the canceling request of the power supply mode that is set is acquired via the network NW or the like.

What is claimed is:

1. An information processing device comprising:
   a processor that is configured to control setting and cancelling of a power supply mode in which a power supply device operates, for a vehicle including the power supply device that supplies electric power to the outside, the processor configured to
   receive a first request to set the vehicle to the power supply mode,
   acquire and receive an input of a first password in response to receiving the first request to set the vehicle to the power supply mode,
   in response to receiving the input of the first password, set the vehicle to the power supply mode and stop a travelling function of the vehicle,
   when the vehicle is in the power supply mode and an instruction to control an air conditioner or an audio equipment is received, not execute the instruction to control the air conditioner or the audio equipment, and output information requesting input to cancel the power supply mode on a display,
   receive a second request for cancelling the power supply mode of the vehicle,
   request an input of a second password in response to receiving the second request for cancelling the power supply mode of the vehicle,
   acquire and receive an input of the second password,
   compare the first password and the second password,
   when the second password matches the first password, cancel the power supply mode of the vehicle and restart the travelling function of the vehicle, and
   when the second password mismatches the first password, not cancel the power supply mode of the vehicle.

2. The information processing device according to claim 1, wherein the first password and the second password include biometric information for authentication.

3. The information processing device according to claim 1, wherein the first password and the second password include information regarding a position of a key of the vehicle.

4. The information processing device according to claim 1, wherein the processor is configured to lock a door of the vehicle in the power supply mode.

5. The information processing device according to claim 1, wherein the processor is configured to lock a tire lock device in the power supply mode.

6. A vehicle, comprising:
   a power supply device that supplies electric power to the outside; and
   a processor that is configured to control setting and cancelling of a power supply mode in which the power supply device operates, the processor configured to
   receive a first request to set the vehicle to the power supply mode,
   acquire and receive an input of a first password in response to receiving the first request to set the vehicle to the power supply mode,
   in response to receiving the input of the first password, set the vehicle to the power supply mode and stop a travelling function of the vehicle,
   when the vehicle is in the power supply mode and an instruction to control an air conditioner or an audio equipment is received, not execute the instruction to control the air conditioner or the audio equipment, and output information requesting input to cancel the power supply mode on a display,
   receive a second request for cancelling the power supply mode of the vehicle,
   request an input of a second password in response to receiving the second request for cancelling the power supply mode of the vehicle,
   acquire and receive an input of the second password,
   compare the first password and the second password,
   when the second password matches the first password, cancel the power supply mode of the vehicle and restart the travelling function of the vehicle, and
   when the second password mismatches the first password, not cancel the power supply mode of the vehicle.

7. The vehicle according to claim 6, wherein the first password and the second password include biometric information for authentication.

8. The vehicle according to claim 6, wherein the first password and the second password include information regarding a position of a key of the vehicle.

9. The vehicle according to claim 6, wherein the processor is configured to lock a door of the vehicle in the power supply mode.

10. The vehicle according to claim 6, wherein the processor is configured to lock a tire lock device in the power supply mode.

11. A non-transitory storage medium that stores a program that causes a processor to execute:
    controlling setting and cancelling of a power supply mode in which a power supply device operates, for a vehicle including a power supply device that supplies electric power to the outside by
    receiving a first request to set the vehicle to the power supply mode,
    acquiring and receiving an input of a first password in response to receiving the first request to set the vehicle to the power supply mode, in response to receiving the input of the first password, setting the vehicle to the power supply mode and stopping a travelling function of the vehicle, when the vehicle is in the power supply mode and an instruction to control an air conditioner or an audio equipment is received, not executing the instruction to control the air conditioner or the audio equipment, and outputting information requesting input to cancel the power supply mode on a display, receiving a second request for cancelling the power supply mode of the vehicle, requesting an input of a second password in response to receiving the second request for cancelling the power supply mode of the vehicle, acquiring and receiving an input of the second password, comparing the first password and the second password, when the second password matches the first password, cancelling the power supply mode of the vehicle and restart the travelling function of the vehicle, and when the second password mismatches the first password, not cancelling the power supply mode of the vehicle.

12. The non-transitory storage medium according to claim 11, wherein the first password and the second password include biometric information for authentication.

13. The non-transitory storage medium according to claim 11, wherein the first password and the second password include information regarding a position of a key of the vehicle.

14. The non-transitory storage medium according to claim 11, wherein the program causes the processor to lock a tire lock device in the power supply mode.

\* \* \* \* \*